United States Patent
Blaszczak

(10) Patent No.: US 6,615,255 B1
(45) Date of Patent: Sep. 2, 2003

(54) REMOTE ADMINISTRATION OF A SYSTEM USING CONFIGURATION LOGIC OBJECTS

(75) Inventor: Bogdan Blaszczak, Plano, TX (US)

(73) Assignee: InterVoice Limited Partnership, Reno, NV (US)

( * ) Notice: Subject to any disclaimer, the term of this patent is extended or adjusted under 35 U.S.C. 154(b) by 0 days.

(21) Appl. No.: 09/211,225

(22) Filed: Dec. 14, 1998

(51) Int. Cl.[7] ............................................. G06F 15/177
(52) U.S. Cl. ........................ 709/220; 709/219; 709/221; 709/227
(58) Field of Search ................. 709/220, 219, 709/221, 203, 200, 201, 227; 379/34, 10, 15, 29

(56) References Cited

U.S. PATENT DOCUMENTS

| | | | | |
|---|---|---|---|---|
| 5,386,545 A | * | 1/1995 | Gombos, Jr. et al. | 395/575 |
| 5,673,322 A | * | 9/1997 | Pepe et al. | 380/49 |
| 5,732,074 A | * | 3/1998 | Spaur et al. | 370/313 |
| 5,732,212 A | * | 3/1998 | Perkoltz et al. | 395/200.11 |
| 5,734,831 A | * | 3/1998 | Sanders | 709/223 |
| 5,774,689 A | * | 6/1998 | Curtis et al. | 395/500 |
| 5,802,281 A | * | 9/1998 | Clapp et al. | 395/200.04 |
| 5,812,394 A | * | 9/1998 | Lewis et al. | 700/17 |
| 5,825,361 A | * | 10/1998 | Rubin et al. | 345/349 |
| 5,835,129 A | * | 11/1998 | Kumar | 348/15 |
| 5,872,810 A | * | 2/1999 | Philips et al. | 375/222 |
| 5,953,389 A | * | 9/1999 | Pruett et al. | 379/9 |
| 5,958,007 A | * | 9/1999 | Lee et al. | 709/219 |
| 5,958,013 A | * | 9/1999 | King et al. | 709/227 |
| 5,974,444 A | * | 10/1999 | Konrad | 709/203 |
| 5,980,096 A | * | 11/1999 | Thalhammer-Reyero | 364/578 |
| 5,999,948 A | * | 12/1999 | Nelson et al. | 707/506 |
| 6,006,263 A | * | 12/1999 | Horwitz | 709/225 |
| 6,026,438 A | * | 2/2000 | Piazza et al. | 709/221 |
| 6,038,664 A | * | 3/2000 | Schumacher et al. | 713/2 |
| 6,266,340 B1 | * | 7/2001 | Pickett et al. | 370/442 |
| 6,389,464 B1 | * | 5/2002 | Krishnamurthy et al. | 709/220 |
| 6,421,714 B1 | * | 7/2002 | Rai et al. | 709/217 |

FOREIGN PATENT DOCUMENTS

EP       0803808 A2 * 10/1997 ....................... 9/46

* cited by examiner

Primary Examiner—Frantz B. Jean
(74) Attorney, Agent, or Firm—Fulbright & Jaworski L.L.P.

(57) ABSTRACT

A system and method for accessing and configuring remote systems is disclosed. A home system having a generic interface establishes a connection with a remote system. The home system determines the current configuration of the remote system, such as the installed features and software version. The remote system then provides any necessary configuration logic objects to the home system. The configuration logic objects are associated with the specific feature and software on the remote system. Using the configuration logic objects for a particular remote system, the generic interface provides a list of valid configuration options to the user. The user is thereby able to modify the configuration of the remote system without having to know the specific features and software that are installed on the remote system and without the risk of selecting an invalid configuration. Configuration logic objects may also monitor the configuration options selected by the user and verify that the selected options are valid.

36 Claims, 1 Drawing Sheet

REMOTE ADMINISTRATION OF A SYSTEM USING CONFIGURATION LOGIC OBJECTS

TECHNICAL FIELD

The present invention is directed to the remote administration of a system, and in particular to configuring a remote system from a home system using configuration logic objects.

BACKGROUND

Some computer systems and networks comprise a number of remote computers which operate independently of the other computers in the system or network. In these systems there is an occasional need for a user at a home location to access the remote systems. For instance, there may be a need to provide updated data to the remote system or to change the operating parameters of the remote system. Each remote system typically has some configuration logic objects that allows a user to modify the system. The configuration logic objects can be different for each remote system and depend upon the specific combination of features and software on the remote system. A user at the home system connects to the remote system and uses the remote configuration logic objects to modify the remote configuration.

One consideration in these systems is that each of the remote systems may have been constructed or modified at different times and, therefore, each may have different features, capabilities and software. In order for a user at the home location to modify a remote system, the user must know the specific characteristics and capabilities of that particular remote system. The user must also know which features or capabilities interact with each other and which features can and cannot be used at the same time.

One solution to this problem would require a highly trained or experienced user who could interpret information about each remote system and then determine how to modify each specific remote system to achieve the desired configuration. This solution has an inherent problem in that it requires an experienced or trained user who is both technically proficient and able to remember all the nuances of each software version or system upgrade. This type of person may not always be available. Furthermore, it may not be feasible for one person to know all the various features and software versions that have been installed on the remote systems.

Another solution would be to maintain a copy of each remote configuration logic object at the home location. However, this is difficult when there are a large number of remote locations. Maintaining individual configuration logic objects for each remote system could require an excessive amount of storage capacity. In this situation, the users would still require a higher level of technical proficiency and training so that they could identify and select the proper stored configuration logic objects for a particular remote location. Also, if the remote systems are updated or modified with new software or hardware, then there must be some capability to also modify the home system stored configuration logic objects for that remote system.

SUMMARY OF THE INVENTION

The problems of the prior art are solved by a system and method in which the configuration logic objects of a remote system can be downloaded in real-time from the remote system into a generic shell program at the home system. When the home system connects to a remote location, the remote configuration logic objects can be sent to the home system from the remote system. The generic configuration shell program then uses the remote configuration logic objects to display the correct configuration options to the user. This allows the generic shell to show only valid options for the remote system, thereby preventing the user from misconfiguring the remote system.

The present invention has two main elements. One element resides on a home system that is used to configure remote systems. The other element resides on the remote machine to be configured by the user. The element on the home system is a generic shell that allows the user to establish communications with any remote system. The generic shell exchanges information with the remote system to establish the current configuration of the software and hardware on the remote system.

Once the home system determines the configuration information, such as the software version and features that are installed on the remote system, it can then determine which configuration logic objects to use for presentation to the user. In some cases the home system will already have the proper configuration logic objects for a particular remote system. If the home system does not already have the correct configuration logic objects for a particular remote system, then it can prompt the remote system to transfer the specific configuration logic objects which will allow the configuration shell to present options that are compatible with the remote system's features and software.

The present invention allows the user at the home system to configure any remote location without requiring the user to know the current configuration of each remote system. When the remote locations are modified, such as when new or updated run-time software is installed, a new configuration logic object for that modification is installed on the remote system. When the generic shell at the home system connects to the remote system, it determines whether the remote system has been modified and if a new configuration logic object must be used. If a home system is used a number of times to configure a particular remote location, then the home system may still have the proper configuration logic objects stored locally. This would reduce the amount of data that has to be transmitted over the communication link between the home and remote systems. In this situation, the home system could simply verify that there are appropriate configuration logic objects stored locally before re-using them. The home system has the capacity to store configuration logic objects for a number of remote systems.

It is a feature of the present invention to provide a system and method by which a user at a home location can access remote systems and perform operations on the remote systems, such as changing the configuration of the remote system. The home system comprises a generic shell program which obtains any specific information or data that it needs from the remote system.

It is another feature of the present invention to provide a system and method in which a user needs a minimal amount of remote system information in order to initiate access to the remote system. The present invention also allows the user to access remote systems using a device, such as a notebook or other portable computer, that does not have the capacity to store configuration logic objects for all of the remote systems. A generic program on the portable device establishes communication with the remote system and then requests any required information or data from the remote system, thereby allowing the user to access the remote system.

It is a further feature of the present invention to allow a user to access and configure a remote system without requiring the user to know the specific features and software that are on the remote system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
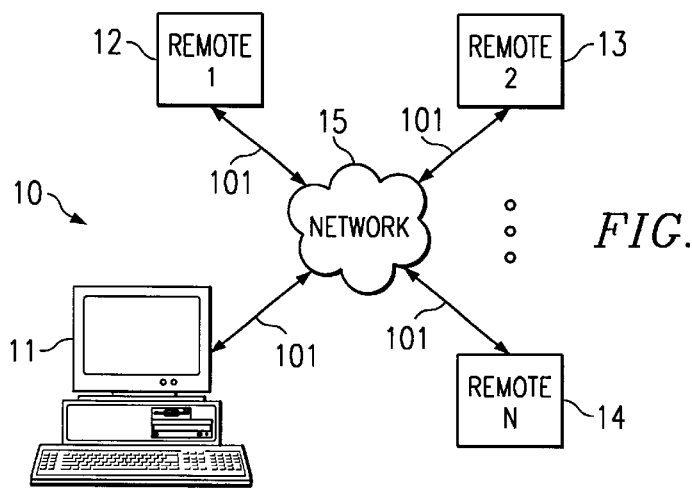
FIG. 1 is a high level block diagram of a system incorporating the present invention.

FIG. 1 shows a typical system 10 which incorporates the present invention. In system 10, home system 11 is connectable to remote systems 12, 13 and 14. Home system 11 and remote systems 12–14 may be computers or other devices, such as telephone switching equipment. In one embodiment, remote systems 12–14 are telephone switching systems that are located at diverse geographical locations, such as in different cities in the United States or in different parts of the world. Each remote location 12–14 is uniquely configured to operate with other remote systems, such as a local phone system, and to provide a specific application, such as a call director or voice response unit function. Home system 11 may be a computer terminal at a service provider's location, such as at the manufacturer of remote systems 12–14. The manufacturer may be responsible for installing, maintaining and upgrading each remote system 12–14. Accordingly, the manufacturer needs to access each remote system, but may not desire to travel to each remote location to access systems 12–14.

The present invention allows the manufacturer to remotely access each remote system 12–14 from home system 11. In this manner, the manufacturer can remotely update each system or perform maintenance on each system. System 10 allows a user at the manufacturer's location to change the configuration of a remote system without having to previously know the specific unique configuration of each remote system 12–14. Home system 11 is linked to remote systems 12–14 via some data connection 101, such as over telephone lines connected through switched public telephone network (SPTN) 15. The connection between home system 11 and remote systems 12–14 can be any other well-known means for linking multiple computer or data systems, such as dedicated telephone lines, direct cable connections, the internet or wireless connections (not shown).

Remote systems 12–14 may have been installed at different times and, as a result, each system may have a different version of the operating software. The software version that is installed depends upon when each remote system was installed and what applications were installed on each remote system. Remote systems 12–14 may also vary depending upon the features or options that were selected by the remote system owner. For example, a remote user may have the capability of select or disable certain features in remote system 12–14. This would allow the user to change the remote configuration without the home system user's knowledge. Various features or options in remote systems 12–14 may be driven by factors in each remote operating environment, such as regulatory requirements or technical limitations. It would be unlikely for a technician at home location 11 to be aware of all of the factors and limitations each remote location 12–14. The present invention allows the user at the home location to select the proper home system configuration in order to ensure that home system 11 is compatible with remote systems 12–14.

Figure 2:
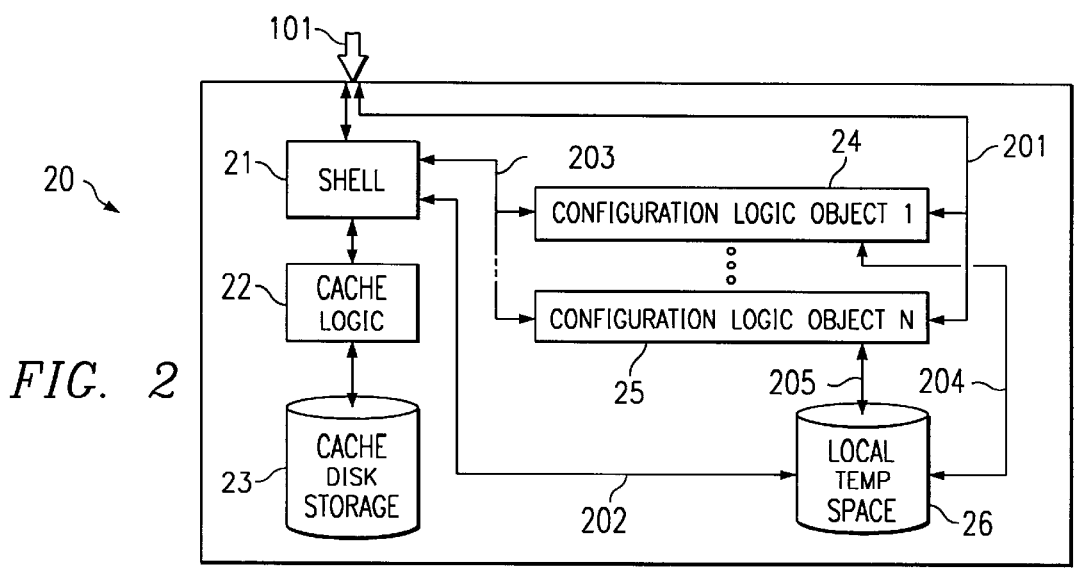
FIG. 2 is a block diagram of the components of the home system of the present invention.

FIG. 2 is a block diagram showing configuration circuitry 20 for home system 11. Shell 21 provides an interface to a user at home system 11. The interface allows the user to select remote machines 12–14 and to establish communications with the remote machines. Typically, shell 21 will be a graphical user interface (GUI) that presents a list of potential remote system configurations, such as a list of the features that can be selected in remote system 12–14. Remote systems 12–14, which are discussed in detail below with respect to FIG. 3, comprise configuration logic objects which indicate the configuration capabilities of the remote systems. The configuration logic objects correspond to specific features of the run-time software on remote systems 12–14. Shell 21 detects which configuration logic objects are present on the remote system and then determines whether a copy of those configuration logic objects are present on home system 11. A local copy of a particular configuration logic object, such as objects 24 or 25, may be present on home system 11 if there have been previous interactions between home system 11 and a particular remote system 12–14. Shell 21 can access the configuration logic objects, such as objects 24 and 25, via communications link 203. Shell 21 verifies that a stored configuration logic object, such as 24, is the same as the object on a remote system and then shell 21 uses stored object 24 to select which options should be displayed to the user at home system 11.

If a particular configuration logic object is not resident on home system 11, then shell 21 obtains that configuration logic object from remote system 12–14 over communication link 101. Shell 21 can request remote system 12–14 to transmit configuration data. The configuration data that is retrieved by shell 21 may be the active configuration set currently in use on remote system 12–14 or it may be an archived configuration set that is stored on the remote system. Shell 21 can store the configuration data from remote system 12–14 in local temporary space 26 via communication link 202. Configuration data that is stored in local temporary space 26 can be accessed by configuration logic objects 24 and 25 via connections 204 and 205.

The configuration logic objects that are received from remote systems 12–14 may be stored on home system 11, such as in cache disk 23. Cache logic 22 is coupled to shell 21 and is used to maintain cache disk space 23. In order to maintain necessary configuration logic objects, cache logic 22 ensures that unused or rarely used objects are deleted first to make space available for new configuration logic objects.

Once the proper configuration logic objects have been obtained and stored on home system 11, then shell 21 uses that configuration logic objects to create an interface that allows a home system user to select or modify the configuration options for remote systems 12–14. By using the remote systems' own configuration logic objects, shell 21 prevents remote systems 12–14 from being incorrectly configured by preventing the home system user from selecting invalid or unavailable options.

Stored configuration logic objects 24 and 25 can directly access remote systems 12–14 via links 201 and 101. This capability allows the stored objects to make additional requests. For example, stored configuration logic objects 24 and 25 may need to directly access remote systems 12–14 in order to determine the specific hardware that is used at the remote locations. Configuration logic objects 24 and 25 can also monitor the configuration options selected by the user and verify that each option and the resulting combination of options are valid. This verification function prevents the user from creating configurations that would not work in the remote system.

Figure 3:
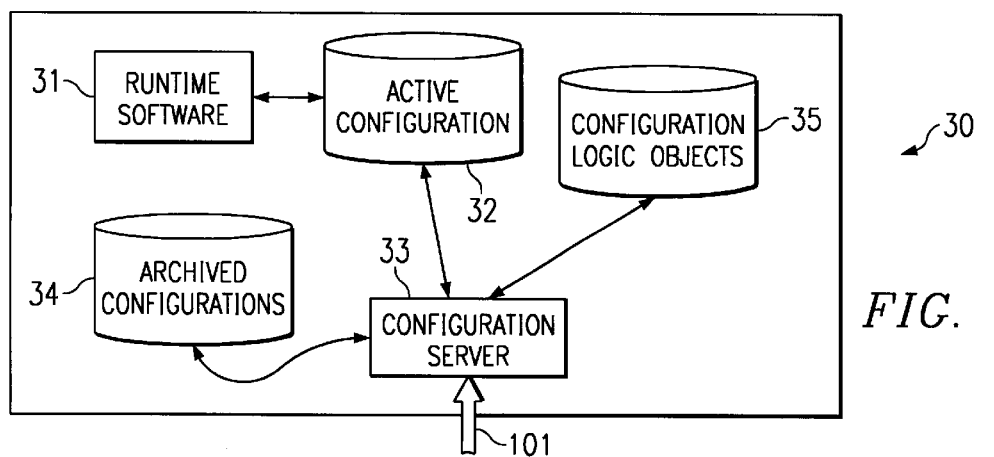
FIG. 3 is a block diagram of the components of the remote system of the present invention.

Turning now to FIG. 3, a typical remote system is shown as system 30. Remote system 30 operates using run-time software 31. Active configuration storage 32 contains the active configuration set that run-time software 31 needs to perform its functions. Configuration server 33 can modify the active configuration set by retrieving one of the archived configuration set that are stored on archived configuration disk 34. A list of the archived configuration sets can be presented to the home system user via communication link 101 and shell 21. Configuration server 33 will then activate one of the configuration sets based upon the user's request.

Configuration logic objects are stored on storage device 35. The configuration logic objects correspond to features in run-time software 31. Each configuration logic object identifies the feature that it is associated with as well as the version of the feature. This version information is used by cache logic 22 to verify that the configuration logic objects stored on home system 20 are equivalent to the configuration logic on remote system 30. By providing the capability to identify and verify the specific logic object versions on home system 20 and remote system 30, the number of data transfers over link 101 can be reduced to only those cases in which home system 20 does not have a particular version of the remote configuration logic object.

The basic operation of system 10 is such that home system 11 is the active element and remote systems 12–14 are passive elements. Each remote system 12–14 has a configuration server 33. These configuration servers wait for communications from home system 20 over link 101. In response to requests from home system 20, configuration server 33 provides information about various run-time software features and versions. Configuration server 33 can also provide a copy of the configuration logic objects via link 101 if home system 20 does not contain the proper configuration logic objects. Once home system 20 has the correct configuration logic objects and configuration data, then the user can modify the configuration data. When the modifications are complete, the configuration data is transmitted from home system 20 back to remote system 30 over link 101.

Although the present invention and its advantages have been described in detail, it should be understood that various changes, substitutions and alterations can be made herein without departing from the spirit and scope of the invention as defined by the appended claims.

What is claimed is:

1. A method for configuring a remote system from a home system comprising the steps of:

establishing a connection between said remote system and said home system;

determining a current configuration of said remote system;

selecting configuration logic objects corresponding to said remote system current configuration;

displaying a set of configuration options to a user on said home system, wherein said configuration options correspond to said remote system configuration logic objects, and wherein said set of configuration options are selected so that only valid remote system configuration options are displayed to said user on said home system; and modifying said remote system current configuration in response to configuration selections made by said user on said home system.

2. The method of claim 1 wherein said current configuration comprises a particular software version.

3. The method of claim 1 wherein said current configuration comprises hardware configuration information.

4. The method of claim 1 wherein said remote system is telephone switching equipment.

5. The method of claim 1 wherein said current configuration determining step further comprises the step of:

retrieving a list of features and a software version from said remote system.

6. The method of claim 5 wherein said list of features and said software version are used to select said configuration logic objects.

7. The method of claim 1 further comprising the step of:

determining whether said configuration logic objects are available on said home system.

8. The method of claim 7 further comprising the step of:

retrieving said configuration logic objects from said remote system when said configuration logic objects are not available on said home system.

9. The method of claim 1 wherein said configuration logic objects validate said configuration selections made by said user.

10. A network in which a home system can communicate with one or more remote systems, wherein each of said remote systems has a configuration and wherein said home system is used to modify said remote system configurations, said network comprising:

means for determining a current configuration for said remote systems;

means for selecting configuration logic objects corresponding to said remote systems' configurations;

means for determining whether said remote system configuration logic objects are available on said home system;

means for displaying configuration options to a user of said home system, wherein said configuration options correspond to said configuration logic objects; and means for changing said remote systems' configurations in response to configuration options selected by said home system user.

11. The network of claim 10 wherein said remote systems current configuration comprise particular software versions.

12. The network of claim 10 wherein said remote systems current configuration comprises hardware configuration information.

13. The network of claim 10 wherein said remote system is telephone switching equipment.

14. The network of claim 10 wherein said configuration options are selected so that only valid remote system options are displayed to said user on said home system.

15. The network of claim 10 wherein said remote system current configuration comprises:

a list of features and a software version from said remote system.

16. The network of claim 10 further comprising:

means for retrieving said remote configuration logic objects from said remote system when said configuration logic objects are not available on said home system.

17. The network of claim 10, wherein said configuration logic objects validate said configuration options selected by said home system user.

18. A home system for a network in which said home system can connect to one or more remote systems and wherein a user at said home system can configure said remote systems, said home system comprising:

means for receiving current configuration data from said remote systems;

means for autonomously determining valid configuration options from said current configuration data, wherein said valid configuration options correspond to configuration capabilities of at least one of said remote systems;

means for providing the configuration options to said user;

means for receiving configuration option selections from said user; and means for directing said remote system to modify its configuration based upon said selected configuration options.

19. The home system of claim 18 further comprising:

a computer program for interfacing with said user, wherein said computer program comprises said providing means and said configuration options receiving means.

20. The home system of claim 19 wherein said computer program is a graphical user interface program.

21. The home system of claim 19 wherein said computer program is a shell program which utilizes said remote system current configuration data to operate.

22. The home system of claim 18 wherein said current configuration data comprises:

configuration logic objects associated with a particular remote system, wherein said configuration logic objects indicate configuration capabilities of the particular remote system for use by said home system in displaying configuration options at said home system.

23. The home system of claim 22 wherein said configuration logic objects comprise features of said remote system.

24. The home system of claim 22 wherein said configuration logic objects comprise a remote system run-time software version.

25. The home system of claim 18 further comprising:

means for storing said received current configuration data.

26. The home system of claim 25 wherein said storing means provides temporary configuration data storage.

27. The home system of claim 25 wherein said storing means provides permanent configuration data storage.

28. The home system of claim 18, wherein said means for receiving configuration option selections validates said selections.

29. A remote system for a network in which a home system is connected to one or more remote systems and wherein a user can configure said remote systems from said home system, said remote system comprising:

means for storing current configuration data;

means for transmitting said current configuration data to said home system, wherein said current configuration data transmitted to said home system includes configuration logic objects indicating configuration capabilities of the remote system for use by said home system in autonomously selecting valid configuration options corresponding to said configuration capabilities of the remote system, said configuration options to be displayed at said home system; and means for receiving instructions from said home computer, wherein said instructions direct said remote system to modify said current configuration in a predetermined manner.

30. The remote system of claim 29 wherein said configuration logic objects comprise a run-time software version for said remote system.

31. The remote system of claim 29 further comprising:

means for storing said current configuration data.

32. The remote system of claim 29 further comprising:

means for storing archived configuration data corresponding to previously used remote system configurations.

33. The remote system of claim 29 wherein said remote system is telephone switching equipment.

34. The method of claim 1 wherein said configuration logic objects corresponding to said remote system current configuration indicate configuration capabilities of the system for use by said home system in selecting configuration options to be displayed at said home system.

35. The method of claim 34 further comprising:

preventing said user on said home system from creating a remote system configuration which is in operable on said remote system, wherein said configuration capabilities indicated by said configuration logic objects are utilized in said preventing step.

36. A method for configuring a remote system from a home system comprising the steps of:

establishing a connection between said remote system and said home system;

determining a current configuration of said remote system;

selecting configuration logic objects corresponding to said remote system current configuration;

displaying a set of configuration options to a user on said home system, wherein said configuration options correspond to said remote system configuration logic objects, wherein said configuration logic objects corresponding to said remote system current configuration indicate configuration capabilities of the system for use by said home system in selecting configuration options to be displayed at said home system;

modifying said remote system current configuration in response to configuration selections made by said user on said home system; and monitoring the configuration options selected by said user on said home system and verifying that a resulting combination of options is valid.

* * * * *